(No Model.)

A. G. HOHENSTEIN.
PRESSURE REGULATOR.

No. 383,225. Patented May 22, 1888.

Witnesses,
E. J. Nottingham
G. F. Downing

Inventor,
A. G. Hohenstein,
By his Attorney,
H. A. Seymour.

UNITED STATES PATENT OFFICE.

ARCHIE G. HOHENSTEIN, OF BROOKLYN, NEW YORK, ASSIGNOR TO THE HOHENSTEIN MANUFACTURING COMPANY, OF NEWARK, NEW JERSEY.

PRESSURE-REGULATOR.

SPECIFICATION forming part of Letters Patent No. 383,225, dated May 22, 1888.

Application filed September 10, 1887. Serial No. 249,334. (No model.)

*To all whom it may concern:*

Be it known that I, ARCHIE G. HOHENSTEIN, of Brooklyn, in the county of Kings and State of New York, have invented certain new and useful Improvements in Pressure-Regulators; and I do hereby declare the following to be a full, clear, and exact description of the invention, such as will enable others skilled in the art to which it appertains to make and use the same.

My invention relates to an improvement in pressure-regulators, the object of the invention being to provide a pressure-regulator with a valve for opening or closing the passage-way leading to the pressure-regulator to enable the latter to be readily taken apart and dismantled for cleaning or repairs when necessary; and with this object in view my invention consists, essentially, in the combination, with a pressure-regulator, of a hand-valve located in a valve-casing which communicates with the casing of the regulator.

Figure 1:
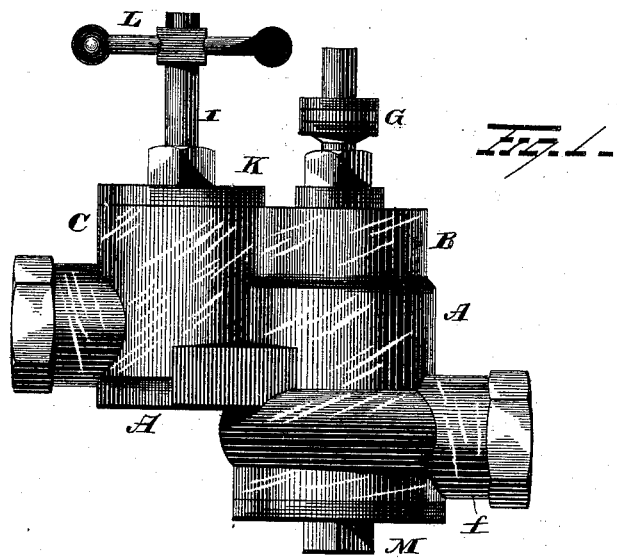
Figure 2:
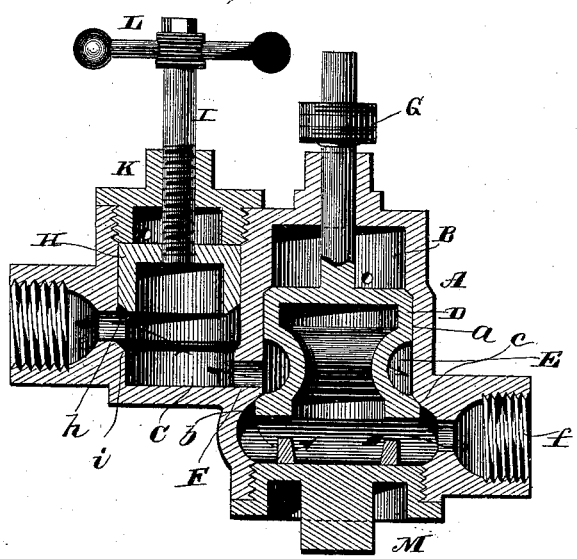

In the accompanying drawings, Figure 1 is a view in side elevation of a combined pressure-regulator and shut-off valve, and Fig. 2 is a longitudinal vertical section of the same.

A represents the casing, which is preferably made of a single casting and provided with two cylinders, B C. In cylinder B is placed the balanced valve D, which latter consists of a piston, $a$, at its upper end and a conical valve, $b$, at its lower end, which engages a conical valve seat, $c$, formed on the casing. Between the piston and conical valve is formed an annular chamber, E, which is located adjacent to the inlet-port F of the pressure-regulator cylinder, so that as steam, gas, or water flows through the inlet-port F it will enter this annular chamber, surrounding the valve, and exert an equal pressure upwardly and downwardly on the valve, and consequently balance it as against pressure from the supply pipe or main. On the stem of the balance-valve or connected therewith are weights G, which operate to force the valve downwardly and allow the steam or water supply to flow past the valve and out of the exit-port $f$. Whenever the pressure in the service-pipe connected with the exit-port $f$ exceeds a predetermined amount, such excess of pressure will exert itself upwardly against the closed head of the balanced valve and raise the latter, and thus cut off the supply of gas or steam to the service-pipe and cause it to remain shut off until the pressure in the service-pipe has decreased to the proper and predetermined amount, when the valve will again drop and admit a further supply. As I have in an even application herewith made claims to this construction of pressure-regulator, I make no claim to it herein, but simply show and describe it as one form of pressure-regulator with which my shut-off valve is combined.

In cylinder C is located a piston-valve, H, the lower edge of which is ground with a conical face, $h$, which is adapted to snugly seat itself on the conical seat $i$, formed on the outer casing. To the valve H is connected a screw-stem, I, which extends upwardly through the screw-threaded cap K, and is provided on its outer end with a handle or wheel, L. Whenever it is desired to cleanse the balanced valve in order to insure its sensitive action in maintaining a uniform pressure in the service-pipe, the shut-off valve is screwed down firmly against its seat, thereby completely shutting off all communication between the supply-main and the pressure-regulator. The cap M of the pressure-regulator can be removed, the valve taken out and cleansed, the cylinder cleansed, and the valve then replaced and the cap screwed on again. The shut-off valve is then opened and pressure admitted to the regulator again. The shut-off valve, being located in the same casing with the pressure-regulator, adds but little to the expense of the device, while it adds very materially to its value, because it provides every pressure-regulator with means by which the supply thereto can be quickly shut off without interfering with the supply to any other regulator and without causing any unnecessary waste of time in inspecting, cleaning, or repairing the regulator.

Having fully described my invention, what I claim as new, and desire to secure by Letters Patent, is—

1. The combination, with a pair of integrally-formed communicating cylinders, one cylinder being connected with a supply pipe or main and the other cylinder with a service-pipe, of a shut-off valve in one cylinder and a pressure-regulator in the other, substantially as set forth.

2. The combination, with a pair of integral cylinders having a communicating passage, one cylinder being connected with a supply pipe or main and the other cylinder with a service-pipe, of a shut-off valve in one cylinder and a pressure-regulator in the other, the latter having an annular chamber therein adjacent to the communicating passage, substantially as set forth.

3. The combination, with a pair of integrally-formed cylinders having a communicating passage, one cylinder being connected with a supply-pipe and the other cylinder with a service-pipe, of a shut-off valve in one cylinder, a pressure-regulator in the other, and screw-caps in each of these cylinders, whereby they may be opened and cleaned, substantially as set forth.

In testimony whereof I have signed this specification in the presence of two subscribing witnesses.

ARCHIE G. HOHENSTEIN.

Witnesses:
 E. R. MEEKER,
 BEN. F. WORRELL.